Oct. 23, 1962     Z. BROZDOWICZ     3,059,305
DIE CLEANING MEANS
Filed March 8, 1960     2 Sheets-Sheet 1
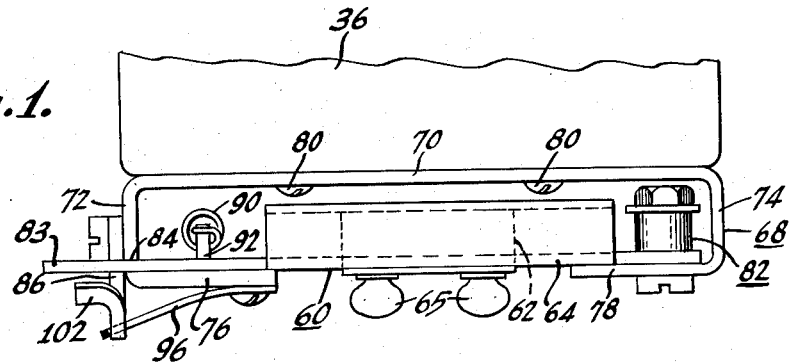
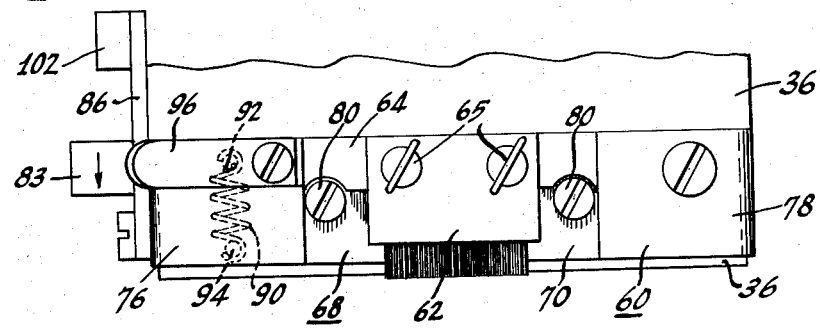
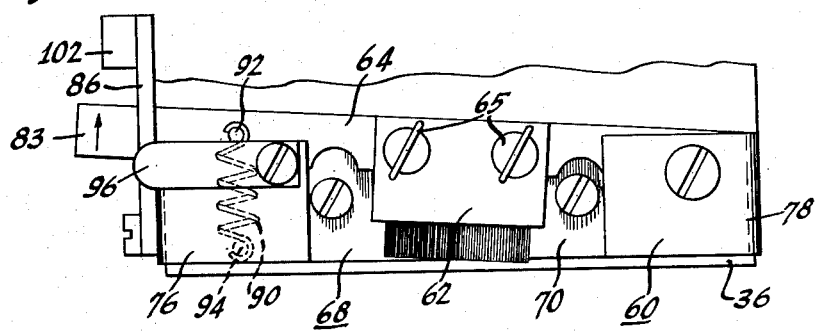
INVENTOR.
ZYGMUNT BROZDOWICZ
BY
ATTORNEY

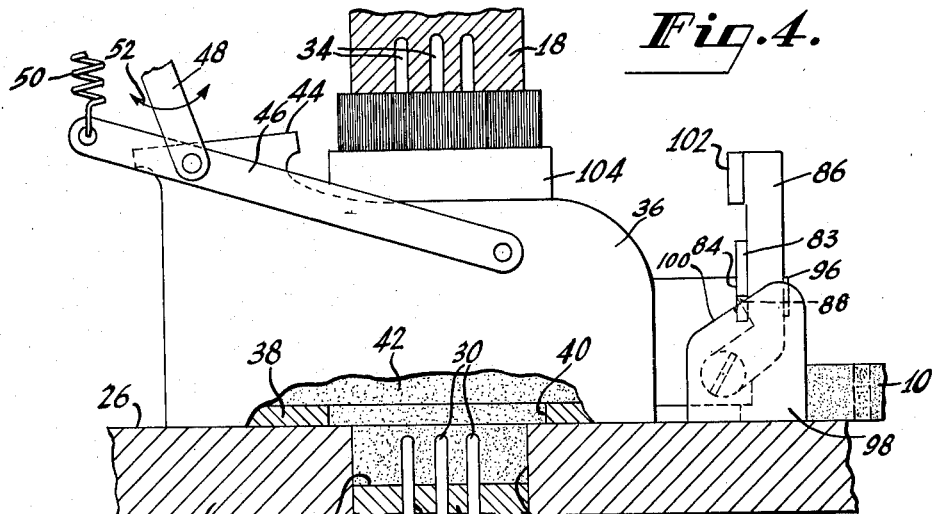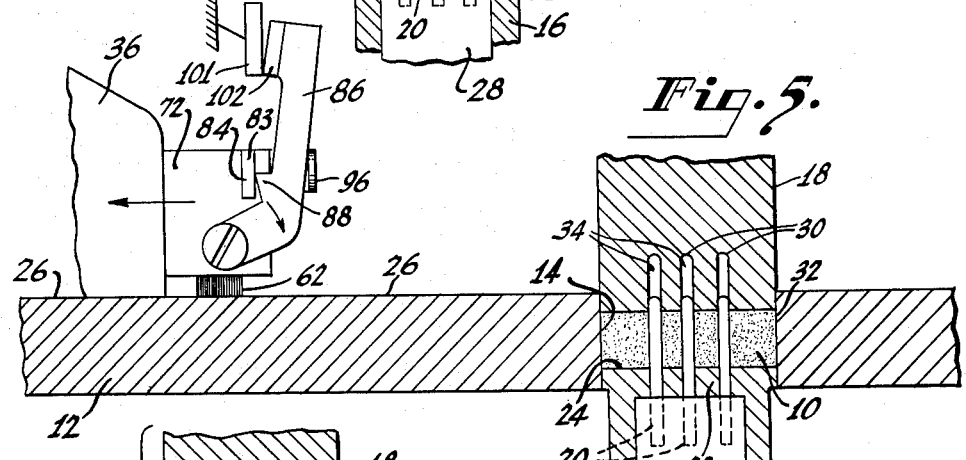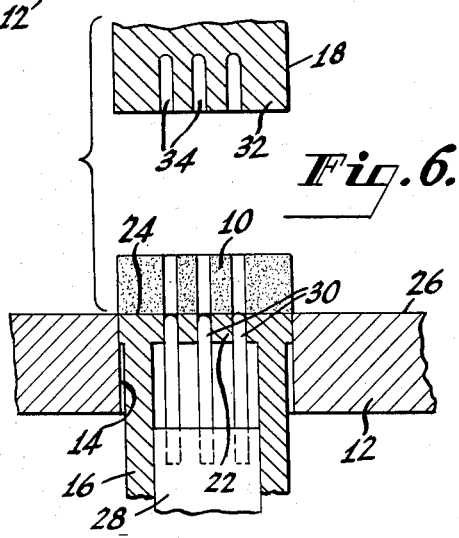

United States Patent Office 3,059,305
Patented Oct. 23, 1962

3,059,305
DIE CLEANING MEANS
Zygmunt Brozdowicz, Montclair, N.J., assignor to Radio Corporation of America, a corporation of Delaware
Filed Mar. 8, 1960, Ser. No. 13,648
4 Claims. (Cl. 25—103)

This invention relates generally to die cleaning means, and more particularly to apparatus for cleaning residual particles of molding material from dies in a repetitive-process, molding press. The die cleaning means of the present invention are particularly useful for cleaning one or more of the faces of plunger dies in molding presses of the type wherein powdered molding material is compressed periodically within a mold cavity to form objects useful in the manufacture of electron tubes.

In the manufacture of some electron tubes, perforated, ceramic wafers, formed by a repetitive process in a molding press, are used. The press for forming these wafers comprises a flat plate formed with a mold cavity therein. Upper and lower plunger dies are reciprocated periodically within the mold cavity to compress powdered molding material, deposited periodically in the mold cavity, into the desired objects.

It has been found that particles of the molding material tend to stick to the faces of the plunger dies after the molded object has been removed from the mold cavity. Unless these residual particles of molding material are removed periodically, they interfere with the dimensional uniformity of the molded objects. Where powdered, ceramic material is to be molded to very close dimensional tolerances, it has been found necesary to clean the plunger dies, in a molding press of the type described, after each group of about fifteen objects have been pressed. Unless this is done, the reject rate of unsatisfactory molded objects is high.

Accordingly, it is an object of the present invention to provide, in molding apparatus of the type described, improved apparatus for cleaning the plunger dies automatically after each molding cycle.

Another object of the present invention is to provide improved die cleaning means for a continuously operated, repetitive-process, molding press that enable the press to produce a relatively much larger quantity of molded objects before the press has to be stopped for cleaning purposes.

Still another object of the present invention is to provide, in a molding press of the type described, die cleaning means that enable the press to produce molded objects of a much greater dimensional uniformity.

A further object of the present invention is to provide, in apparatus of the type described, improved die cleaning means which prevent residual particles from accumulating on, and interfering with, the operation of the dies, but which do not interfere with the powdered plastic material during the molding process.

Still a further object of the present invention is to provide improved die cleaning means that are relatively simple in construction, easily adapted for use in existing repetitive-process, molding presses, and highly efficient in use.

The improved die cleaning means of the present invention are adapted to be used in combination with reciprocating means, such as a reciprocating hopper in a molding press of the type described. The hopper comprises a flat floor formed with an opening therein. Means are provided in the molding press to reciprocate the hopper along a linear path so that the opening in the floor of the hopper and the mold cavity in a plate are aligned periodically. This alignment occurs when the hopper is adjacent the forward end of its path of reciprocation, and a powdered molding material within the hopper falls into the cavity. When the hopper is moved rearwardly, the deposited molding material within the mold cavity is leveled off, and a pair of upper and lower plunger dies are caused to compress the molding material within the mold cavity.

In accordance with one form of the invention, the die cleaning means comprise a brush and a mechanism for mounting the brush on the hopper so that the brush sweeps the plate and the upper face of the lower plunger die only when the hopper moves in a forward direction. A cam fixed to the plate, adjacent to the forward end of the path of travel of the hopper, cooperates with the brush holding mechanism to raise the brush out of contact with the plate. Thus, the brush does not come in contact with the leveled molding powder within the mold cavity during the backward movement of the hopper. A stop, fixed adjacent to the rearward end of the path of travel of the hopper, cooperates with the brush mechanism to lower the brush into contact with the plate, whereby the brush cleans the plate and the top surface of the lower die during the forward motion of the hopper. A second brush, fixed to the upper surface of the hopper, brushes the lower face of the upper plunger die, thereby cleaning this die of any residual molding material sticking to it. By employing the die cleaning means of the present invention, the molding press can mold at least one hundred times as many objects as heretofore without the need to stop the press for cleaning purposes.

The novel features of the present invention, both as to its organization and method of operation, as well as additional objects and advantages thereof, will be more readily understood from the following description, when read in connection with the accompanying drawings in which similar reference characters represent similar parts, and in which:

FIG. 1 is a plan view of one form of die cleaning means according to the present invention, shown attached to a fragment of the hopper of a molding press;

FIG. 2 is a front elevational view of the die cleaning means of FIG. 1 attached to a fragment of the hopper and showing the brush in a lowered position;

FIG. 3 is a front elevational view of the die cleaning means of FIG. 1 attached to a fragment of the hopper and showing the brush in an elevated position;

FIG. 4 is a side elevational view (as seen from the left of FIG. 3) of the die cleaning means attached to the hopper of a molding press, the hopper being shown adjacent to the forward end of its path of reciprocation, and the brush being in a raised position, some parts being in cross-section and some parts being cut away;

FIG. 5 is a side elevational view (as viewed from the left of FIG. 2) of the die cleaning means attached to the hopper, the hopper being shown adjacent to the rearward end of its path to travel, and the brush being in a lowered position, some parts being in cross-section and some parts being cut away; and FIG. 6 is a cross-sectional view of the die plate and the die plungers, with the molded object in a position to be removed by the forward movement of the hopper.

Referring, first, more particularly to FIGS. 4, 5 and 6, there are shown portions of a repetitive-process, molding press for molding like objects, such as a perforated ceramic wafer 10. Since such presses are well known in the art, details of structure and operation of these presses not forming a part of the present invention will be omitted in the interest of brevity. The press comprises a flat plate 12 formed with a mold cavity 14 therein. A lower plunger die 16 and an upper plunger die 18 are provided to be reciprocated within the cavity 14, by any suitable means (not shown) known in the art. The lower die 16 comprises a hollow cylinder formed with a plurality of holes 20 in its upper wall 22. The upper face 24 of the upper wall 22 is flush with the upper face 26 of the plate 12 during a part of the time of travel of the lower die 16 in the repetitive molding process, as shown in FIG. 6.

The lower die 16 is adapted to be reciprocated with respect to a stationary cylinder 28 that is disposed coaxially within the lower die 16. A plurality of pins 30 are fixed to the top end of the cylinder 28 and are arranged in linear alignment with the holes 20 in the upper wall 22 of the lower die 16. It will now be understood that the lower die 16 is reciprocated periodically with respect to the fixed cylinder 28 and that the pins 30 extend through the holes 20 in the lower die 16.

The upper die 18 comprises a cylinder having a lower face 32. A plurality of recesses 34, extending upwardly from the lower face 32 of the upper die 18, are formed in a manner to be linearly aligned with, and to fit over, the pins 30 when the upper and lower dies 18 and 16 are moved vertically toward each other, as shown in FIG. 5.

Means are provided to fill the mold cavity 14 with a molding material to be compressed between the lower and upper dies 16 and 18. To this end, the molding press comprises a hopper 36. The hopper 36 comprises a container having a flat floor 38 formed with an opening 40 therein. The hopper 36 is filled with a suitable molding material 42 through a top opening 44.

Means are provided to move the hopper 36 forward and backward, in a reciprocating motion over a linear path, during each cycle of the molding process. To this end, a bar 46 is pivoted at one end to one side of the hopper 36, as shown in FIG. 4. A bar 48 is pivotally connected intermediate the ends of the bar 46. The free end of the bar 46 is biased upwardly by means of a spring 50. The spring 50 is anchored to any suitable part (not shown). A structure (not shown) similar to the bars 46 and 48 and the spring 50 is provided on the other side of the hopper 36 for reciprocating the hopper 36 by any suitable means known in the art. The bar 48 is oscillated forward and backward, in the directions indicated by the double-headed arrow 52, so that the hopper 36 is reciprocated forward and backward in a linear path along the plate 12.

The operation of the molding press, used in connection with the die cleaning means of the present invention, will now be explained. Referring to FIG. 4, the hopper 36 is shown at the forward end of its path of reciprocation. The opening 40 in the floor 38 of the hopper 36 is aligned with the cavity 14 in the plate 12. The molding material 42 falls from the hopper 36 into the cavity 14 by gravity. The lower and upper dies 16 and 18 are separated from each other during the loading of the cavity 14.

On the backward movement of the hopper 36, the portion of the floor 38 that defines the opening 40 therein levels the molding material 42 in the cavity 14 flush with the top surface 26 of the plate 12, thereby loading the cavity 14 with the required quantity of molding material for a molded object. The lower and upper dies 16 and 18 are now moved toward each other and they compress the powder 42 into a perforated wafer 10, as shown in FIG. 5.

After the hopper 36 has traveled backward to the end of its path, it is moved forward again. Before the hopper reaches the cavity 14 in the plate 12, however, the lower die 16 pushes the wafer 10 out of the cavity 14, and the upper die 18 is raised, as shown in FIG. 6. The hopper 36, in its continued forward movement, now pushes the wafer 10 away from the lower die 16, as shown in FIG. 4. The molding cycle is repeated when the hopper 36 reaches the end of its forward travel, that is, when the opening in the floor 38 is again aligned with the cavity 14 in the plate 12.

Means are provided to clean the upper face 24 of the lower die 16 and the lower face 32 of the upper die 18 of any residual molding material during each molding operation, since any residual particles on these dies will interfere with the dimensional uniformity of the molded object. Referring, now, to FIGS. 1, 2 and 3 of the drawing, there are shown die cleaning means 60 comprising a brush 62 and means to maintain the brush 62 either in a raised or in a lowered position. The brush 62 is secured to an arm 64 intermediate the ends of the arm by any suitable means, as by wing nuts 65.

The brush 62 and the arm 64 are mounted on the hopper 36 so that they may be reciprocated therewith. A frame 68, made from an elongated flat bar, comprises an elongated rear portion 70, side portions 72 and 74 extending forwardly from opposite ends of the rear portion 70, and end portions 76 and 78 extending inwardly from the forward ends of the side portions 72 and 74, respectively, parallel to the rear portion 70. The frame 68 is fixed to the hopper 36 by any suitable means, as by screws 80, through holes in the rear portion 70 of the frame 68. The arm 64 is pivotally mounted at one end thereof to the end portion 78 of the frame 68, as by a screw and nut assembly 82. The free end 83 of the arm 64 extends substantially parallel to the rear portion 70 of the frame 68 and through a slot 84 in the side portion 72 of the frame 68.

A lever 86 is pivotally mounted, by any suitable means, adjacent one end thereof to the side portion 72 of the frame 68 for rotation in a plane substantially at right angles to the plane of rotation of the arm 64. The lever 86 is formed with a tooth 88 intermediate its ends, the tooth 88 extending rearwardly from the lever 86 toward the hopper 36. The lever 86 comprises means to maintain the brush 62 either in a lowered or in a raised position, as will be explained hereinafter.

A spring 90 connected between a rearwardly extending stud 92, fixed to the arm 64, and a rearwardly extending stud 94, fixed to the end portion 76 of the frame 68, biases the arm 64 downward, that is, toward the upper surface 26 of the plate 12. A flat spring 96, having one end fixed to the end portion 76 of the frame 68 and its opposite, free end pressing against the front edge of the lever 86, urges the lever 86 against the free end 83 of the arm 64.

Means, fixed with respect to the plate 12, are provided to raise the brush 62 during the backward movement of the hopper 36 along its path of reciprocation, and to lower the brush 62 into contact with the upper surface 26 of the plate 12 and the upper surface 24 of the lower die 16 during the forward movement of the hopper 36 along its path of reciprocation. Referring, now, to FIG. 4, there is shown a cam 98, extending upwardly from the plate 12 and fixed to the upper surface 26 of the plate 12 by any suitable means. The cam 98 is formed with an upwardly and outwardly sloping edge 100 adapted to engage the free end 83 of the arm 64, and to raise the arm 64, at substantially the end of the forward movement of the hopper 36, as shown in FIG. 4. The arm 64 is raised against the spring tension of the spring 90 until the tooth 88 of the lever 86 is moved beneath its free end 83. The flat spring 96 biases the lever 86 against the free end 83 of the arm 64, and the tooth 88 of the lever 86 prevents the arm 64 from being lowered. Thus, the brush 62 is raised out of contact with the upper surface 26 of the plate 12. It will now be understood that, during the backward movement of the hopper 36, the brush 62 cannot come in contact with the molding material that has been deposited and leveled off within the cavity 14 in the plate 12.

The brush 62 is lowered into contact with the upper surface 26 of the plate 12 at substantially the end of the rearward movement of the hopper 36. A stop 101, fixed with respect to the plate 12 by any suitable means (not shown), is positioned to engage the free end 102 of the lever 86 when the hopper 36 is at substantially the rear end of its path of reciprocation, as shown in FIG. 5. The fixed stop 101 forces the lever 86 to rotate against the spring tension provided by the flat spring 96, thereby releasing the tooth 88 from beneath the free end 83 of the arm 64. The spring tension provided by the spring 90 will now lower the arm 64 within the slot 84 and bring the brush 62 into contact with the upper surface 26 of the plate 12. The brush 62 remains in sweeping contact with the upper surface 26 of the plate 12 and with the upper surface 24 of the lower die 16 during the forward movement of the hopper 36. This action cleans any residual molding material from the upper face 24 of the lower die 16, and also brushes the molded object 10 away from the lower die 16, as shown in FIG. 4. When the hopper 36 has reached the extreme forward end of its path of reciprocation, the free end 83 of the arm 64 is raised again by the sloping edge 100 of the cam 98 so that the molding process can be repeated cyclically.

A brush 104 is fixed to the upper surface of the hopper 36 so that upwardly extending bristles can brush the lower face 32 of the upper die 18, as shown in FIG. 4. It will now be understood that, as the hopper 36 is moved along its path of reciprocation, the upwardly extending bristles of the brush 104 clean the lower face 32 of the upper die 18 of any residual particles of molding material that may adhere to it.

The brushes 62 and 104 should comprise rows of bristles that are staggered with respect to the direction of motion in a manner whereby they do not leave any streaks of molding material on the faces of the dies over which they pass. Suitable brushes for performing the die cleaning functions described herein have been found to comprise bristles of horse hair having a diameter of approximately 0.004" to 0.008".

From the foregoing description, it will be apparent that there has been provided improved die cleaning means for use in combination with a reciprocating hopper adapted to move between the faces of reciprocating dies. While only one embodiment of the invention has been described, various components useful therein, as well as variations coming within the spirit of this invention, will, no doubt, readily suggest themselves to those skilled in the art. Hence, it is desired that the foregoing shall be considered merely as illustrative and not in a limiting sense.

What is claimed is:

1. In a molding machine of the type having a plate formed with a mold cavity therein, a lower plunger die adapted to be reciprocated periodically in said cavity, said lower plunger die having an upper face flush with said plate periodically during its reciprocation, a hopper, and means to reciprocate said hopper along a path on said plate, said path including said upper face of said lower plunger die, the combination therewith of (a) a cleaning device comprising an elongated arm,
(b) brush means affixed to said arm between the opposite ends of said arm,
(c) mounting means pivotally mounting one of said ends of said arm to said hopper so that said arm may be rotated in a first plane disposed transversely to the direction of said path,
(d) means including a first spring connected between said mounting means and said arm to rotate said arm about its pivotal mounting and to urge the other end of said arm against a portion of said mounting means and to cause said brush means to sweep said upper face of said lower die when said hopper travels in a forward direction along its path of reciprocation,
(e) a lever having one end pivoted to said mounting means adjacent to said other end of said arm, said lever being adapted to rotate in a second plane disposed transversely to said first plane, said lever having a toothed edge,
(f) a second spring fixed to said mounting means and urging said toothed edge of said lever against said other end of said arm,
(g) cam means fixed with respect to said plate adjacent to one end of said path and cooperating with said other end of said arm to lift said other end of said arm when said hopper is travelling in a forward direction, whereby said second spring means may rotate said lever in one direction and cause said other end of said arm to be supported on a tooth of said toothed edge of said lever so as to keep said brush means out of contact with said plate and said upper face when said hopper travels in a direction opposite to said forward direction, and
(h) means fixed adjacent the other end of said path and cooperating with the other end of said lever to rotate it in an opposite direction to that urged by said second spring whereby to cause said other end of said arm to lower from said tooth and to position said brush means into sweeping contact with said plate and said upper face when said hopper travels in said forward direction.

2. In a molding machine of the type comprising a plate formed with a mold cavity therein, plunger dies arranged for vertical reciprocation within said cavity, and hopper means arranged for horizontal reciprocation on said plate and including said cavity to deposit molding material into said cavity to a level flush with the surface of said plate to be compressed by said dies, the combination therewith of (a) an elongated arm,
(b) a brush fixed to said arm intermediate the ends thereof,
(c) mounting means pivotally mounting one end of said arm to said hopper means,
(d) a spring connected to said arm to urge said arm for rotation in a first vertical plane disposed transversely to the direction of said horizontal reciprocation of said hopper,
(e) a resiliently biased lever cooperatively engaged only with the other end of said arm for maintaining said brush in two positions with respect to said plate,
(f) means pivotally mounting one end of said lever,
(g) resilient biasing means for rotating said lever in a second vertical plane disposed transversely with respect to said first vertical plane, said resilient biasing means urging said lever against said other end of said arm,
(h) cam means at one end of said path cooperating with said other end of said arm to rotate said arm about its pivotal mounting and to lift said brush to a first position of said two positions, said lever being formed with a toothed edge adapted to support said other end of said arm when said arm is lifted by said cam means and said resilient biasing means rotates said lever in one direction, and
(i) means fixed adjacent the other end of said path and adapted to rotate said lever means in an opposite direction to that in which it is resiliently biased to cause said arm to be rotated toward said plate by said spring, whereby to move said brush to a second position of said two positions.

3. An attachment for a hopper in a molding machine of the type having a plate formed with a mold cavity therein, a plunger die adapted to be reciprocated periodically in said cavity, said plunger die having a face flush with said plate periodically during its reciprocation, and means to reciprocate said hopper along a path on said plate, said path having a cam adjacent to one end and lever stop means adjacent to the other end thereof, said attachment comprising (a) a frame having a rear portion with two ends, two side portions each extending forwardly from a different one of said two ends of said rear portion, respectively, and a pair of front portions each extending inwardly from a different one of said side portions, respectively,
(b) an elongated arm, (c) means pivotally mounting only one end of said arm to one of said front portions,
(d) a brush,
(e) means fixing said brush intermediate the ends of said arm,
(f) a first spring connected between said arm and the the other of said front portions to urge it to rotate in a first plane about said pivotal mounting means and urging the other end of said arm against the one of said side portion most remote from said one end of said arm,
(g) a lever,
(h) means pivotally mounting said lever adjacent one end thereof to the one of said side portions most remote from said one end of said arm,
(i) a rearwardly extending tooth on said lever, and
(j) a second spring connected to said other front portion and urging said lever and said tooth into contact with said arm adjacent to said other end of said arm, said tooth comprising means to prevent said first spring from rotating said arm when said arm is raised by said cam means and said arm is resting on said tooth, and said first spring urging said other end of said arm against said one side portion of said frame when the other end of said lever cooperates with said lever stop means to force said lever to rotate contrary to the urging of said second spring, whereby said arm ceases to be supported by said tooth.

4. In combination,
(a) a plate formed with a cavity therein,
(b) a hopper for molding material having a floor formed with an opening therein,
(c) means to move said hopper forward and backward along a path such that said opening and said cavity are aligned periodically whereby molding material can be deposited into said cavity when said hopper is adjacent the forward end of said path and whereby said molding material is leveled off flush with the surface of said plate when said hopper moves backward,
(d) a brush,
(e) an elongated arm,
(f) mounting means pivotally mounting only one end of said arm to said hopper for rotation in a plane transverse to the direction of travel of said hopper,
(g) means to mount said brush between opposite ends of said arm to sweep said plate along said path when said hopper moves forward,
(h) cam means fixed to said plate adjacent to the forward end of said path and disposed to raise only the other end of said arm when said hopper is moved adjacent the forward end of said path whereby said brush is raised,
(i) a spring biased lever pivotally fixed to said hopper adjacent one of its ends for rotation in a plane parallel to said path, said lever having an edge formed with a tooth that is adapted to support said other end of said arm when said arm is raised by said cam means during the backward movement of said hopper, and
(j) means fixed with respect to said plate adjacent the rearward end of said path and cooperating with the other end of said lever to move said lever against its spring bias and to lower only said other end of said arm from said tooth of said lever, whereby said brush sweeps said plate during the forward movement of said hopper.

References Cited in the file of this patent

UNITED STATES PATENTS

| | | |
|---|---|---|
| 611,710 | Savory | Oct. 4, 1898 |
| 835,737 | Simmons et al. | Nov. 13, 1906 |
| 994,349 | Updegraff | June 6, 1911 |
| 1,308,213 | Yingling | July 1, 1919 |

FOREIGN PATENTS

| | | |
|---|---|---|
| 492,632 | France | Mar. 28, 1919 |
| 1,025,772 | Germany | Mar. 6, 1958 |
| 267,949 | Great Britain | May 17, 1928 |